2,941,865
PROCESS OF HYDROGENATION OF ANTHRAQUINONES

Max Gonze, Forest-Brussels, and Emile Leblon, Molenbeek-St.-Jean-Brussels, Belgium, assignors to Solvay & Cie., Brussels, Belgium, a Belgian company No Drawing. Filed Oct. 16, 1956, Ser. No. 616,150

Claims priority, application Belgium Oct. 31, 1955

4 Claims. (Cl. 23—207)

The present invention relates to improvements in the catalytic reduction of alkylated or arylated anthraquinones into the corresponding anthrahydroquinones and to the application of these improvements in the manufacture of hydrogen peroxide.

The well known process of manufacture of hydrogen peroxide by reduction-oxidation consists in hydrogenating an alkylated or arylated anthraquinone into the corresponding anthrahydroquinone, in oxidizing the hydroquinone formed into quinone and in separating the hydrogen peroxide formed in the course of this operation.

These reduction and oxidation reactions are carried out in an organic medium dissolving at the same time quinones and hydroquinones. As reaction medium there have been recommended certain dicarboxylic acid esters dissolving at the same time quinones and hydroquinones or also a miscible mixture of a solvent of quinones and a solvent of hydroquinones.

As solvents of hydroquinones there are known secondary aliphatic alcohols, in particular the secondary alcohols containing 7 to 11 carbon atoms, primary alcohols, heptanol, ethanol and the like, methylcyclohexanol and the like.

As solvents of quinones there are known aromatic hydrocarbons such as benzene, toluene, xylene, naphthalene, tetrahydronaphthalene, anisole, the alkylated or halogenated derivatives of naphthalene, and the like.

The reduction of anthraquinones into anthrahydroquinones is effected with hydrogen under the catalytic action of Raney nickel, of catalysts based on palladium or other reduction catalysts.

In the hydrogenation of anthraquinones there are formed, in addition to the main reaction leading to anthrahydroquinones, hydroanthrahydroquinones due to the fixation of hydrogen on the aromatic nucleus.

This secondary reaction takes place regardless of the catalyst used; it is, however, comparatively more important when the reduction is catalysed by nickel.

It is the object of the present invention to reduce substantially the formation of hydroanthrahydroquinones in the manufacture of anthrahydroquinones by catalytic reduction of anthraquinones. It thereby leads to an improvement of one of the steps of the process of manufacture of hydrogen peroxide.

It consists in effecting the selective catalytic hydrogenation of alkylated or arylated anthraquinones into the corresponding anthrahydroquinones in a reaction medium dissolving anthrahydroquinones and anthraquinones which contains 0.5 to 10 percent of a chlorinated hydrocarbon soluble in the reaction medium.

Among the chlorinated hydrocarbons, compounds are preferably chosen whose boiling point is sufficiently high to obviate losses by carrying away in the course of the hydrogenation process or, as may be the case, in the subsequent oxidation.

Tichlorethylene, perchlorethylene, hexachlorethane, the chlorocyclohexanes, the chlorobenzenes and the chloronaphthalenes are very suitable for promoting the selective hydrogenation of anthraquinones into anthrahydroquinones.

Although these compounds may be used within the limits of concentration mentioned above, it has been found that outstanding results are obtained by adding the chlorinated hydrocarbons, singly or as a mixture, in such a quantity that the concentration in the solvent is in the vicinity of 1 percent by weight.

The applicants are aware that ortho-dichlorobenzene and alpha-monochloronaphthalene have already been proposed as solvents in the processes of manufacture of hydrogen peroxide by reduction-oxidation (British Patent No. 449,360 and U.S. patent application Ser. No. 530,196 of August 23, 1955, in the name of Mr. Rossier). It has, however, never been found that the addition of so small quantities as those mentioned in the present invention was to have a selective influence on the hydrogenation of anthraquinones into anthrahydroquinones.

The influence of these small quantities of chlorinated hydrocarbons is proved by the experiments described in the following:

1 litre of a solution containing 500 millilitres of benzene and 500 millilitres of octylic alcohol is introduced into a flask having a capacity of 2 litres. Thereto are added 30 grams of 2-ethylanthraquinone, 5 grams of Raney nickel and a given weight of the chlorinated hydrocarbon to be tested. The air present in the flask is replaced by hydrogen, stirring is effected by placing the flask into a cradle, and a diagram is drawn, giving the volume of fixed hydrogen as a function of time. There is first obtained a straight line whose angular coefficient represents the speed $V_1$ of fixation of hydrogen per gram-molecule of quinone.

When about 1 gram-molecule of hydrogen per gram-molecule of anthraquinone is fixed, it is observed that the volume of fixed hydrogen per unit of time strongly decreases and a straight line is obtained whose angular coefficient represents the speed $V_2$ of fixation of hydrogen on the nucleus of 2 ethylanthraquinone.

The ratio $V_2:V_1$ is commonly used to express the quantity of 2-ethyltetrahydroanthrahydroquinone formed in the course of the hydrogenation of 2-ethylanthraquinone.

The results of four experiments are mentioned in the following table:

| Introduced chlorinated hydrocarbon | Weight of chlorinated hydrocarbon, g/100 g. of solvent | Conventional ratio, $V_2:V_1$ |
|---|---|---|
| nil | | 0.15 |
| Trichlorethylene | 1 | 0.0075 |
| Perchlorethylene | 1 | 0.06 |
| Monochlornaphthalene | 1 | 0.05 |

These experiments show that the addition of 1 percent of chlorinated hydrocarbon to the usual solvent decreases the ratio of the hydrogenation speed of the aromatic nucleus to the hydrogenation speed of the =C=O group of the quinone in the proportions of 1 to 20 for trichlorethylene, 1 to 2.5 for perchlorethylene, and 1 to 3 in the case of monochloronaphthalene.

The process according to the invention is directly applicable to the manufacture of hydrogen peroxide by catalytic hydrogenation of an alkylated or arylated anthraquinone into the corresponding anthrahydroquinone and subsequent oxidation by means of oxygen or a gas containing the same so as to regenerate the anthraquinone and to produce hydrogen peroxide. In the application of this process the formation of tetrahydroanthrahydroquinone is substantially reduced if the reduction and oxidation reactions are carried out in a solvent containing 0.5 to 10 percent by weight of a chlorinated hydrocarbon.

We claim:
1. In the process for the catalytic hydrogenation to the corresponding anthrahydroquinones of anthraquinones selected from the group consisting of alkyl anthraquinones and aryl anthraquinones, the step of effecting hydrogenation of said anthraquinones in a solvent medium containing a mononuclear aromatic hydrocarbon, an aliphatic alcohol containing up to 11 carbon atoms and 0.5% to 10% by weight of a chlorinated hydrocarbon selected from the group consisting of trichloroethylene, perchloroethylene and monochloronaphthalene.

2. In the process for the production of hydrogen peroxide by catalytic hydrogenation to the corresponding anthrahydroquinone of anthraquinones selected from the group consisting of alkyl anthraquinones and arylanthraquinones, and oxidation of said anthrahydroquinones to reform the anthraquinones and to produce hydrogen peroxide, the steps of effecting hydrogenation and oxidation in a solvent medium containing a mononuclear aromatic hydrocarbon, an aliphatic alcohol containing up to 11 carbon atoms and 0.5% to 10% by weight of a chlorinated hydrocarbon selected from the group consisting of trichloroethylene, perchloroethylene and monochloronaphthalene.

3. The process defined in claim 1, wherein the chlorinated hydrocarbon consists of trichloroethylene.

4. The process defined in claim 2, wherein the chlorinated hydrocarbon consists of trichloroethylene.

References Cited in the file of this patent

UNITED STATES PATENTS

| | | |
|---|---|---|
| 2,215,856 | Pfleiderer | Sept. 24, 1940 |
| 2,215,883 | Riedl et al. | Sept. 24, 1940 |
| 2,668,753 | Harris et al. | Feb. 9, 1954 |

FOREIGN PATENTS

| | | |
|---|---|---|
| 1,092,393 | France | Nov. 10, 1954 |
| 758,235 | Great Britain | Oct. 3, 1956 |

OTHER REFERENCES

Ruggli et al.: "Helvetica Chimica Acta," vol. 12, pp. 97–98 (1929).